United States Patent [19]

Sack et al.

[11] 4,309,486

[45] Jan. 5, 1982

[54] ELECTROSTATIC RECORDING MATERIAL

[75] Inventors: Wieland Sack, Bissendorf; Reiner Anthonsen, Bramsche; Ferencz Kertész, Bissendorf, all of Fed. Rep. of Germany

[73] Assignee: Felix Schoeller Jr. GmbH & Co. KG, Osnabruck, Fed. Rep. of Germany

[21] Appl. No.: 3,940

[22] Filed: Jan. 16, 1979

[30] Foreign Application Priority Data

Jan. 19, 1978 [DE] Fed. Rep. of Germany ....... 2802135

[51] Int. Cl.[3] ........................ B32B 23/08; B32B 27/10

[52] U.S. Cl. ............................... 428/511; 204/159.15; 427/44; 427/54.1; 427/121

[58] Field of Search ................ 428/500, 511; 427/121, 427/44, 54.1; 430/127, 130, 538; 204/159.15, 159.16, 159.22

[56] References Cited

U.S. PATENT DOCUMENTS

| | | | |
|---|---|---|---|
| 3,132,584 | 5/1964 | Dalton | 427/121 |
| 3,295,977 | 1/1967 | Dezul | 430/155 |
| 3,482,513 | 12/1969 | Michalchek et al. | 427/121 |
| 3,615,448 | 10/1971 | Yeshin | 430/281 |
| 3,640,766 | 2/1972 | Jursich et al. | 430/127 |
| 3,840,390 | 10/1974 | Kozu et al. | 430/285 |
| 3,911,170 | 10/1975 | Honjo et al. | 430/127 |
| 3,936,530 | 2/1976 | Morgan | 430/945 |
| 3,956,562 | 5/1976 | Shibato et al. | 427/121 |
| 4,049,448 | 9/1977 | Honjo et al. | 430/127 |
| 4,072,592 | 2/1978 | Dué et al. | 428/511 |
| 4,081,583 | 3/1978 | Akuyama et al. | 428/511 |
| 4,085,236 | 4/1978 | Ishibashi et al. | 427/121 |
| 4,100,045 | 1/1978 | Bogan et al. | 428/511 |
| 4,120,721 | 10/1978 | Ketley et al. | 427/44 |
| 4,139,675 | 2/1979 | Nagai | 428/511 |
| 4,148,639 | 4/1979 | Sinkovitz | 428/511 |
| 4,170,663 | 10/1979 | Hahn et al. | 427/44 |
| 4,177,310 | 12/1979 | Steeves | 427/44 |

*Primary Examiner*—James J. Bell

*Attorney, Agent, or Firm*—Lockwood, Dewey, Alex & Cummings

[57] ABSTRACT

Electrostatic recording material is made by coating a conducting paper support with a lacquer comprising at least one unsaturated organic compound and substantially no inert solvent and hardening the lacquer by exposure to radiation such as an electron beam or ultraviolet to form a dielectric layer. The dielectric layer retains charge well at high humidities.

14 Claims, No Drawings

ELECTROSTATIC RECORDING MATERIAL

FIELD OF INVENTION

This invention relates to an electrostatic recording material, consisting of an electrically conducting paper support and of a dielectric coating thereon, which serves for recording a latent electrostatic image.

PRIOR ART

Electrostatic recording papers consist of an electrically conducting paper support, on which a dielectric coating is applied. The paper support is soaked or coated on one or both sides with an electrolyte. As electrolyte, salts may be used, but normally conducting resins are used. For the dielectric coating, highly insulating polymers, such as silicone resins, epoxy resins, polyvinyl acetates, vinyl chloride resins, styrene-butadiene-copolymers, polystyrene, polymethacrylic acid ester, polyvinylidene chloride, polyvinyl acetate, polyester and the like may be used (as described for example in German Pat. Nos. 2,512,864 and 2,558,973). These polymers are dissolved in organic solvents.

Attempts have also been made to apply the dielectric coating from aqueous solutions, as described for instance in German Pat. Nos. 2,537,518 and 2,558,973.

The dielectric coatings should not only be highly insulating but also should have a white appearance, be opaque and in particular be capable of being written upon and printed. Mineral pigments are therefore incorporated into the dielectric resins. However hard plastics powders which are insoluble in the solvents used for the coating have also been described as matting agents (German Pat. Nos. 2,128,848 and 2,512,864).

Finally, one particular system uses mineral pigments which have been made water-repellent at the surface (U.S. Pat. No. 3,973,055). The objective of making the pigment surface water repellent is to retain the insulating effect of the dielectric coating even at fairly high values of atmospheric relative humidity.

A disadvantage of all dielectric coatings produced with the assistance of organic solvents is that a migration of small quantities of the conducting resins from the paper support into the dielectric coating takes place by the action of these solvents and as a result the surface resistance is reduced. If this is to be avoided, the prior, additional application of a priming coat as a barrier coating on the paper base is necessary, in order to prevent penetration of the solvent used into the paper. Also, the majority of organic solvents are easily ignited or are explosive and in many cases are toxic to human beings. Appropriate safety precautions therefore have to be taken when applying the dielectric coatings. In order to prevent environmental pollution, solvent recovery installations are also necessary.

With dielectric coatings applied by an aqueous process, the risk of contamination of the dielectric layer by the conducting substances contained in the paper is even greater than with coatings applied without the use of water.

The aqueous solutions used usually contain ionic surface-active agents, such as emulsifiers. The pigments used to make the surface mat and capable of being written upon must also be of a hydrophilic nature, to enable them to be thoroughly worked into the dielectric layer. All these disadvantages manifest themselves in electrostatic recording papers coated by aqueous processes in reduced surface resistances and thus in reduced electrostatic charging capability, which becomes particularly severe at higher values of air humidity.

Both in aqueous and in organic coating systems special problems arise due to the mineral pigments used predominantly for creating whiteness, opacity and the capability for being written upon. ZnS, $TiO_2$, $CaCO_3$, $BaSO_4$, $SiO_2$, kaolin and other silicates are used as such pigments. Even in organically applied dielectric coatings (i.e. those applied without water), these inorganic white pigments become surrounded, on account of their polar surface character, with a hydrate sheath, the thickness of which increases with the atmospheric relative humidity in the surroundings. This results, particularly at fairly high relative humidity values (e.g. 60% and above) in the formation of electrolyte bridges, which reduce the surface resistance of the dielectric layer and thus its electrostatic charging capability.

Therefore, use is frequently made of the already mentioned mineral pigments that have been made water-repellent, for example by treating their surfaces with waxes, organo-titanates or similar compounds. Even these pigments, however, absorb water vapour from the atmosphere and reduce the dielectric resistance of the layer. This is particularly noticeable if the papers are tested at high relative humidities (80% and higher).

By the use of hard, powdered, organic plastics, the adverse effects of the mineral pigments are indeed avoided, but by their nature such "organic pigments" result in a considerably reduced whiteness and, because of the relatively small difference between their refractive index and that of the organic binding agents, lead to only a very low opacity of the coated paper.

SUMMARY OF INVENTION

It is an object of the present invention to provide an electrostatic recording material, the dielectric coating of which possesses the whiteness and opacity equivalent to a coating filled with mineral white pigments but which nevertheless gives a satisfactory electrostatic charging capability with a good image density even at high relative humidities for example of 80% and higher.

Other objects of the invention will appear from the following description.

According to the invention the dielectric coating is produced from a lacquer capable of being hardened by energy-rich radiation, the binder content of the lacquer consisting wholly or partly of unsaturated organic compounds, and which is free from non-reactive solvents.

Although such coating materials, due to their monomer content, possess similar physical properties to solvent-containing, physically drying (i.e. drying by evaporation of solvent) lacquer mixtures, and although the conducting resins of the base paper can also migrate into these dielectric coatings before they are hardened, and although the mineral pigments used are also surrounded with a hydrate sheath, it has surprisingly been found that in fact the conducting resins do not migrate to a detectable extent into the radiation-hardening lacquer material, and that in particular inorganic pigment additives in radiation-hardening lacquers reduce the electrical resistance at high values of atmospheric humidity considerably less than in solvent-containing lacquers. This manifests itself above all in satisfactory to good image densities at higher relative humidities.

This effect is all the more surprising in that, at the high drying temperature required in conjunction with the forming of azeotropic mixtures from solvents and water for physical drying of solvent-containing lacquers the pigments are made almost water-free, whereas in radiation-hardening lacquers almost no (ERH-) or only slight (UVH-) heat is produced in the lacquer and the pigments do not give up the water still adhering to them. Understandably, however, the best results are obtained if the pigments have been predried (calcined).

DETAILED DESCRIPTION OF EMBODIMENTS

Constituents of the lacquers according to this invention may contain ethylenically unsaturated groups, which polymerise on exposure to energy-rich radiation. The lacquers may comprise unsaturated pre-polymers, unsaturated monomers, covering and matting pigments, photoinitiators, reaction accelerators, noncross-linking resins with good dielectric properties, soft resins, flowing agents, viscosity adjusters, pigment floating agents and other constituents. They may also, however, be very simple mixtures and be composed of only a few of these products, for example a vinyl monomer and a mineral pigment.

The unsaturated pre-polymers may, for example, be:

Pure polyacrylates, polyester acrylates; urethane acrylates, epoxy acrylates, unsaturated polyesters, polyether acrylates, alkyd acrylates and other ethlenically unsaturated compounds, such as described for example in German Pat. No. 2,352,524.

The monomers are preferably mono-, di- or trifunctional acrylates, or styrene, styrene derivatives or other low-molecular weight, unsaturated compounds.

The photoinitiators for UV-hardening may be sulphochlorides and sulphides of organic compounds, benzoin derivatives, furoine derivatives, peroxides, benzophenone and its derivatives and the products described in German Pat. Nos. 2,352,524 and 2,447,790, and U.S. Pat. Nos. 3,988,228 and 4,014,771.

Aliphatic or aromatic amines may serve as reaction accelerators or synergistic agents.

For electron-radiation-hardening systems (ERH) no special catalysts are generally necessary. Addition of other constituents, such as viscosity regulators and the like, is possible.

Resins and soft resins for additionally improving the dielectric properties or the viscosity of the coating materials may be any products which possess these corresponding properties and can be worked into the lacquer receptor. Particularly suitable are epoxy resins, polyvinyl acetates and/or copolymers with ethylene and/or vinyl chloride, polystyrene, alkyd resins, polyvinyl butyral, polyesters, styrene-acrylonitrile copolymers, polymethacrylic esters, cellulose acetates.

Suitable pigments for improving the writing capability, whiteness and opacity are commercially available pigments which are not so detrimental to the dielectric properties of the lacquers as to render them unusable. Particularly suitable are zinc sulphide, titanium dioxide, silicic acids, clays and calcium carbonate. Organic polymers, such as polyolefins, polyamides, urea-formaldehyde condensation products, melamine-formaldehyde condensation products, polyacrylonitriles and others which are described in German Pat. No. 2,512,864 and U.S. Pat. Nos. 3,951,882 and 3,953,421, can be used also to a certain extent provided that the whiteness and opacity of the coating are not adversely affected. In the interests of improved dispersion capability, it is advantageous if the mineral pigments are treated to make them organophilic, as described for example in German Pat. No. 2,411,219. However contrary to German Pat. No. 2,411,219, it is not of importance for the electrographic properties whether the pigment is organophilically treated. Even where normally dried mineral pigments in polymerisable binder systems are used, superior electrographic properties are obtained with the present invention even at high values of atmospheric humidity.

As radiation sources for carrying out the "in situ" polymerisation any devices may be used the radiation of which is capable with or without auxiliary substances in the lacquer of attaining a sufficient depth of penetration and of transmitting the energy which is necessary for the polymerisation of the lacquer. Preferred devices are high-pressure mercury vapour lamps and, particularly, electron guns.

The advantages of electrostatic recording papers produced according to this invention are illustrated in the following examples. Example 1 demonstrates first of all state of the art according to U.S. Pat. No. 2,951,882, which is characterised in that a physically drying lacquer system is used. The other examples represent production according to the present invention of electrostatic papers by means of radiation-hardening systems.

EXAMPLE 1

Coatings of dielectric lacquers (a) and (b) were applied to respective samples of a commercial base paper, which had been made conducting in known manner with one or more electrolytes. Lacquer (a) was a physically drying lacquer, which contained an organophilically treated, calcined aluminium silicate as white pigment. Lacquer (b) was the same lacquer without the white pigment.

The lacquers comprised:

(a) 14.7% by weight polyvinyl butyral (Mowital B 60 HH);
5.3% by weight organophilic aluminium silicate (Kaolin OX-2 );
48% by weight toluene;
32% by weight ethanol.

(b) 15.5% by weight polyvinyl butyral (Mowital B 60 HH);
50.5% by weight toluene;
34.0% by weight ethanol.

These flowable and brushable lacquers were applied by means of a wiper bar uniformly onto the paper, air dried at room temperature and then subsequently dried in a hot cupboard for half a minute at 120° C. After drying, the applied lacquer weighed 6 $g/m^2$ in both cases.

The thus produced dielectrically coated paper specimens were tested together with the specimens from Example 2 below.

The lacquers of Example 1 containing polyvinyl butyral as binder are representative of a large number of physically drying lacquers which all gave similar results. As binders in these lacquers, the following were investigated with and without pigment: epoxy resins, polyacrylates, polyesters, polystyrene, various commercial copolymers, cellulose acetobutyrate and mixtures of these.

EXAMPLE 2

Other samples of the same conducting base paper as in Example 1 were coated with a pigmented (a) and a non-pigmented (b) radiation-hardening lacquer.

The lacquers comprised:

(a) 33.5% weight hexane diol diacrylate;

26.5% by weight epoxy acrylate (epicote acrylate DRH 370);
13.5% by weight epoxy resin (epicote 1001);
26.5% by weight organophilic aluminium silicate (Kaolin OX-2).
(b) 45.6% by weight hexane diol acrylate;
36.1% by weight epoxy acrylate;
18.3% by weight epoxy resin.

The application of these flowable and brushable lacquers was carried out with a wiper bar. They were then hardened under inert gas with accelerated electrons at 10 Mrad energy dose. The lacquer coating weighed 6 $g/m^2$.

The electrostatic recording materials produced according to Examples 1 and 2 were tested together both at 50% relative humidity and 23° C. and at 80% relative humidity and 23° C. For this purpose, the lacquer coatings were charged by means of an electrode with an applied voltage of 600 V and the remaining charges were measured after various intervals of time. Parallel to this, specimens of the same material, after charging in the same manner, were blackened with toner liquid (Statos 973,274 by the Firm Varian GmbH, Munich) and the extent of blackening was measured with a Kosar reflection densitometer (as described in The Focal Encyclopedia of Photography, page 303, Focal Press, London 1957). The results of these comparative tests are summarised in Table 1.

EXAMPLE 3

Samples of the same conducting base paper as in Example 1 were respectively coated on one side by means of a wiper bar at 6 $g/m^2$ with each of the following flowable and brushable lacquer compositions and the lacquer coating in each case was hardened with UV radiation (100 W/cm) in 5 seconds.

TABLE 1

Results of tests on specimens of Examples 1 and 2

| | Test at 50% r.h. and 23° C. | | | | | | Test at 80% r.h. and 23° C. | | | |
|---|---|---|---|---|---|---|---|---|---|---|
| | Surface charge (V) after | | | | Loss of charge after | Blackening | Surface charge (V) after | | | Blackening |
| Example | 15 sec | 2 min | 30 min | 1 hr. | 1 hr.(%) | (immediate) | 15 sec | 1 min | 2 min | (immediate) |
| 1a (with pigment) | 365 | 215 | 90 | 60 | 84 | 1.26 | 10 | 0 | 0 | 0.0 |
| 1b (without pigment) | 365 | 270 | 140 | 110 | 70 | 1.38 | 140 | 87.5 | 67 | 1.15 |
| 2a (with pigment) | 380 | 250 | 150 | 105 | 73 | 1.39 | 155 | 73 | 52 | 1.30 |
| 2b (without pigment) | 395 | 270 | 170 | 120 | 70 | 1.45 | 170 | 165 | 120 | 1.35 |

(a) 32% by weight hexane diol acrylate;
25% by weight unsaturated epoxy acrylate (epicote acrylate DRH 370);
13% by weight epoxy resin (epicote 1001);
25% by weight organophilic aluminium silicate (Kaolin OX 2);
5% by weight photoinitiator (Irgacure 651).
(b) 38% by weight ethylene glycol dimethacrylate (Sartomer SR 206);
25% by weight acrylate resin (Roskydal KL 2337);
13% by weight styrene copolymer (Piccolastic A 25);
17% by weight organophilic aluminium silicate;
3% by weight micronized polypropylene wax (Lancowax PP 1362 D);
4% by weight photoinitiator (Irgacure 651).
(c) 22% by weight unsaturated epoxy acrylate (epicote-acrylate DRH 370);
47% by weight ethylene glycol dimethacrylate (Sartomer SR 206);
11% by weight vinyl acetate/fatty acid vinyl ester interpolymer (Vinnapas B 100/VL 20);
13% by weight organophilic calcined aluminum silicate (Kaolin OX2);
3% by weight micronized polypropylene wax (Lancowax PP 1362 D);
4% by weight photoinitiator (Irgacure 651).
(d) 69% by weight unsaturated polyester resin comprising 33% styrene (Aldurol VUP 53);
21% by weight organophilic calcined aluminium silicate (Kaolin OX 2);
7% by weight photoinitiator (Irgacure 651);
3% by weight reaction accelerator (Uvecryl P 101).

The specimen sheets thus produced were charged as in Example 2 at 80% r.h. and 23° C. with 600 V applied voltage and immediately blackened with liquid toner (Statos 973,274). The density of the blackening was measured with the Kosar reflection densitometer. The results are summarised in Table 2.

TABLE 2

Blackening Densities of the paper specimens of Example 3 charged at 80% r.h. and treated with toner

| Example No. | Density |
|---|---|
| 3a | 0.84 |
| 3b | 1.03 |
| 3c | 0.75 |
| 3d | 0.72 |

The test data exhibited a satisfactory blackening in all cases, whereas usual physically drying lacquers with the same pigmentation and under the same conditions gave no visible blackening. (Compare Example 1a).

EXAMPLE 4

Samples of the same conducting base paper as in Example 1 were coated respectively on one side by means of a wiper bar at 6 $g/m^2$ with each of the following flowable and brushable lacquer compositions, and the lacquer coating was in each case hardened by electron radiation at 10 Mrad under inert gas.
(a) 33% by weight hexane diol diacrylate;
27% by weight unsaturated acrylate resin (Roskydal KL 2337);
13% by weight polyester resin (Atlac 382 E);
27% by weight organophilic calcined aluminium silicate (Kaolin $OX_2$);
(b) 24% by weight epoxy acrylate (Ebekryl 600);
16% by weight oligotriacrylate (OTA 480);
24% by weight isobornyl acrylate (QM 589);
16% by weight styrene copolymer (Piccolastic A 25);

8% by weight amorphous silicic acid (Gasil EBN);
12% by weight zinc sulphide (Sachtolith HD).
(c) 48% by weight aluminium silicate (Kaolin OX2);
52% by weight hexane diol diacrylate (reactive thinner HA).
(d) 14% by weight epoxy acrylate (epicote DRH 370);
22% by weight bisphenol A diacrylate (Ebecryl 150);
7% by weight N-vinyl-2-pyrolidone (V-pyrol);
25% by weight hexane diol diacrylate;
14% by weight styrene copolymer (Piccolastic A 25);
18% by weight aluminium silicate (Satintone No. 1).
(e) 14% by weight epoxy acrylate (epicote DRH 370);
21% by weight bisphenol A acrylate (Ebecryl 150);
24% by weight hexane diol diacrylate;
14% by weight styrene copolymer (Piccolastic A 25);
27% by weight aluminium hydroxide (Martinal F-A/1).

The specimen sheets thus produced were each charged at 80% r.h. and 23° C. on the coated side with an applied voltage of 600 V and the charge remaining was measured after 15 sec, 1 min and 2 min. On each occasion a second specimen sheet was blackened with liquid toner (Statos 973,274) immediately after charging in the same way and the density was measured as in Example 1. The measured values are summarised in Table 3. A comparison of the test data with the values obtained in comparative Example 1a clearly shows the advantage of the electrostatic recording papers produced in this example which, by contrast with the reference values, give satisfactory charges and blackenings even at 80% r.h.

TABLE 3

Charging and densities of the paper specimens of Example 4 tested at 80% r.h.

| Example No. | Charge remaining after: 15 sec | 1 min | 2 min | Blackening density |
|---|---|---|---|---|
| 4a | 140 | 92 | 65 | 1.13 |
| 4b | 125 | 81 | 70 | 1.01 |
| 4c | 98 | 72 | 59 | 0.85 |
| 4d | 116 | 80 | 68 | 0.93 |
| 4e | 131 | 84 | 72 | 0.97 |

In further examples, $TiO_2$, various silicic acids and calcium carbonate were used. The results did not differ significantly from those obtained with Examples 2 to 4. In all cases the retention of charge and density by comparison with Example 1a were satisfactory to good. Addition of organic matting agents, for example in the form of plastics powders, proved to be possible in quantities up to 30% by weight of the inorganic pigment without noticeably detracting from the whiteness of the coating.

We claim:

1. A method of making an electrostatic recording material which comprises coating an electrically conducting paper support with a composition hardenable by exposure to radiation to produce a dielectric coating capable of recording a latent electrostatic image, the composition comprising at least one unsaturated organic compound and substantially no inert solvent, and exposing the coated support to radiation to harden the coating.

2. A method according to claim 1, in which said composition contains at least one pigment.

3. A method according to claim 1, in which said composition contains at least one component selected from neutral resins and plasticisers.

4. A method according to claim 1, in which said unsaturated compound is a monomer having at least one carbon-carbon double bond.

5. A method according to claim 4, in which said composition contains at least one vinyl monomer and at least one unsaturated resin.

6. A method according to claim 1, in which the coated support is exposed to ultra-violet radiation to harden the coating.

7. A method according to claim 1, in which the coated support is exposed to an electron beam to harden the coating.

8. A method according to claim 2, in which said composition contains from 10 to 60% by weight of inorganic pigment.

9. An electrostatic recording material comprising an electrically conducting paper support applied thereto a dielectric coating applied thereto capable of recording an electrostatic latent image, the dielectric coating comprising a composition hardened by exposure to radiation and comprising at least one unsaturated organic compound and substantially no inert solvent.

10. A material according to claim 9, in which said composition contains at least one component selected from neutral resins and plasticisers.

11. A material according to claim 9, in which said composition contains at least one pigment.

12. A material according to claim 9, in which said unsaturated component is a monomer having at least one carbon-carbon double bond.

13. A material according to claim 12, in which said composition contains at least one vinyl monomer and at least one unsaturated resin.

14. A material according to claim 11, in which said composition contains from 10 to 60% by weight of inorganic pigment.

* * * * *

UNITED STATES PATENT AND TRADEMARK OFFICE

CERTIFICATE OF CORRECTION

PATENT NO. : 4,309,486

DATED : January 5, 1982

INVENTOR(S) : Wieland Sack, Reiner Anthonsen, Ferencz Kertesz

It is certified that error appears in the above-identified patent and that said Letters Patent are hereby corrected as shown below:

In the Claims:

In Col. 8, line 32, delete "applied thereto" and insert --having--.

Signed and Sealed this

*Twentieth* Day of *April 1982*

[SEAL]

*Attest:*

GERALD J. MOSSINGHOFF

*Attesting Officer* *Commissioner of Patents and Trademarks*